United States Patent
Kienke et al.

(10) Patent No.: US 8,109,573 B2
(45) Date of Patent: Feb. 7, 2012

(54) VEHICLE SEAT WITH AN INCLINATION ADJUSTMENT DEVICE WITH A FREE-PIVOTING FUNCTIONALITY

(75) Inventors: Ingo Kienke, Wermelskirchen (DE); Karthikeyan S. Maharajapuram, Leverkusen (DE); Albert Reginold Kirubaharan, Burscheid (DE)

(73) Assignee: Johnson Controls Technology Company, Holland, MI (US)

( * ) Notice: Subject to any disclaimer, the term of this patent is extended or adjusted under 35 U.S.C. 154(b) by 99 days.

(21) Appl. No.: 12/514,956

(22) PCT Filed: Nov. 19, 2007

(86) PCT No.: PCT/EP2007/009986
§ 371 (c)(1),
(2), (4) Date: Nov. 12, 2009

(87) PCT Pub. No.: WO2008/058762
PCT Pub. Date: Mar. 22, 2008

(65) Prior Publication Data
US 2010/0060064 A1   Mar. 11, 2010

(30) Foreign Application Priority Data

Nov. 17, 2006 (DE) .......................... 10 2006 054 610
Dec. 28, 2006 (DE) .......................... 10 2006 062 462
Sep. 7, 2007 (DE) .......................... 10 2007 042 604

(51) Int. Cl.
*B60N 2/225* (2006.01)
*B60N 2/235* (2006.01)

(52) U.S. Cl. .................................................. 297/367 R
(58) Field of Classification Search ............... 297/367 R
See application file for complete search history.

(56) References Cited

U.S. PATENT DOCUMENTS 6,474,741 B2 * 11/2002 Kamida et al. ............ 297/378.12
6,733,076 B2 * 5/2004 Grable et al. ............. 297/367 R
(Continued)

FOREIGN PATENT DOCUMENTS

DE     19715764     10/1998
(Continued)

OTHER PUBLICATIONS

German Examination Report dated Nov. 18, 2011.

*Primary Examiner* — Rodney B White
(74) *Attorney, Agent, or Firm* — Fletcher Yoder P.C.

(57) ABSTRACT

A vehicle seat, in particular motor vehicle seat, comprises a backrest part and a seat part. The seat part has a fitting for adjusting the inclination of the backrest part in relation to the seat part. The fitting has a first fitting part which is firmly connected to the backrest part, and a second fitting part which is firmly connected to the seat part. The fitting parts are connected to one another and configured to be adjusted smoothly angularly by an adjusting mechanism. The first fitting part is able to be locked in relation to the adjusting mechanism by a latching apparatus, and is able to be pivoted about a rotational axis in relation to the adjusting mechanism after the latching apparatus is released. The adjusting mechanism comprises a toothed member, such as an internally toothed mechanism latching plate and/or an internally toothed mechanism plate. The first fitting part is mounted in a plane extending generally perpendicular to the rotational axis of the toothed member.

15 Claims, 8 Drawing Sheets

U.S. PATENT DOCUMENTS

| | | | |
|---|---|---|---|
| 7,314,250 B1 * | 1/2008 | Eblenkamp et al. | 297/367 R |
| 7,364,237 B2 * | 4/2008 | Grable et al. | 297/367 R |
| 7,527,336 B2 * | 5/2009 | Kienke et al. | 297/374 |
| 7,571,962 B2 * | 8/2009 | Thiel et al. | 297/367 R |
| 2005/0231015 A1 | 10/2005 | Wilkening | |
| 2010/0096897 A1 * | 4/2010 | Kienke et al. | 297/367 R |

FOREIGN PATENT DOCUMENTS

| | | |
|---|---|---|
| DE | 10 2004 015 234 A1 | 10/2005 |
| DE | 10 2005 021 356 A1 | 11/2006 |
| WO | 2006/040303 A2 | 4/2006 |

* cited by examiner

VEHICLE SEAT WITH AN INCLINATION ADJUSTMENT DEVICE WITH A FREE-PIVOTING FUNCTIONALITY

CROSS REFERENCE TO RELATED APPLICATIONS

This application claims priority from and the benefit of PCT Application No. PCT/EP2007/009986, filed on Nov. 19, 2007; German Patent No. DE 10 2006 054 610.5, filed on Nov. 17, 2006; German Patent DE 10 2006 062 462.9, filed on Dec. 28, 2006; and German Patent DE 10 2007 042 604.8, filed on Sep. 7, 2007; all entitled "Vehicle Seat with an Inclination Adjustment Device with a Free-Pivoting Functionality", which are herein incorporated by reference.

BACKGROUND

The invention relates to an inclination adjustment device with a planetary drive configured as an adjusting mechanism for a vehicle seat. The inclination adjustment device is, on the one hand, suitable for steplessly adjusting the inclination of the backrest of a vehicle seat relative to the seat part by actuating the adjusting mechanism. On the other hand, the inclination adjustment device comprises means (a free-pivoting mechanism) to fold up the backrest independently of the adjusting mechanism to the front into an easy-entry-position (for example inclined by 45° to the front) and/or into a horizontal table position. In this connection, the adjusting mechanism is provided, in particular, as a so-called wobble mechanism.

Such inclination adjustment devices are generally known. For example, an inclination adjustment fitting is disclosed from the German published patent application DE 10 2004 015 234 A1 with a fitting part fixed to the seat part and a fitting part fixed to the backrest, an adjustment of the inclination of the backrest being provided within a comfort range and a latching mechanism with an unlocking facility allowing a free folding of the fitting part fixed to the backrest relative to the fitting part fixed to the seat part. In this connection, it is a drawback that, relative to a simple inclination adjustment fitting, a further operational plane is required, spaced apart in the axial direction, which is associated with an additional space requirement and, moreover, the risk of malfunction, in particular with regard to accident situations.

SUMMARY

An object of the present invention, therefore, is to provide an inclination adjustment fitting in which a highly compact and, at the same time, highly stable design is selected so that such an inclination adjustment fitting may firstly be produced in a manner which is lightweight, cost-effective and stable over its service life and may secondly provide high resistance forces, in particular in accident situations.

This object is achieved by a vehicle seat, in particular motor vehicle seat, with a backrest part, with a seat part and with a fitting for adjusting the inclination of the backrest part in relation to the seat part, the fitting having a first fitting part which is firmly connected to the backrest part and a second fitting part which is firmly connected to the seat part, the fitting parts being connected to one another such that they may be adjusted smoothly in terms of angle by means of an adjusting mechanism, the first fitting part being able to be locked in relation to the adjusting mechanism by means of a latching apparatus and being able to be pivoted about a pivot axis in relation to the adjusting mechanism after the latching apparatus is released, the adjusting mechanism having an internally toothed mechanism latching plate and/or an internally toothed mechanism plate, and the first fitting part being mounted in a plane, extending perpendicular to the rotational axis, of the internal teeth of the mechanism latching plate and/or the mechanism plate in relation to the adjusting mechanism. As a result, it is advantageously possible according to the invention that the mounting plane of the first fitting part (fixed to the backrest part) is provided around part of the adjusting mechanism and/or the wobble mechanism inside the region and/or the plane of the mechanism teeth. As a result, a particularly compact construction of the adjustment fitting is possible.

This object is further achieved by a vehicle seat with a backrest part, with a seat part and with a fitting for adjusting the inclination of the backrest part in relation to the seat part, the fitting having a first fitting part which is firmly connected to the backrest part and a second fitting part which is firmly connected to the seat part, the fitting parts being connected to one another such that they may be adjusted smoothly in terms of angle by means of an adjusting mechanism, the first fitting part being able to be locked in relation to the adjusting mechanism by means of a latching apparatus and being able to be pivoted about a pivot axis in relation to the adjusting mechanism after the latching apparatus is released, according to an alternative embodiment the adjusting mechanism comprising an internally toothed mechanism latching plate and/or an internally toothed mechanism plate and the mechanism plate and/or the mechanism latching plate being provided as planar punched parts, and/or according to a further alternative embodiment the adjusting mechanism comprising an internally toothed mechanism latching plate and/or an internally toothed mechanism plate, and the first fitting part being radially mounted by the mechanism plate and/or the first fitting part being axially mounted by the mechanism latching plate. By the provision of the mechanism plate and/or the mechanism latching plate as planar punched parts, it is advantageously possible according to the invention to produce said mechanism plate and/or mechanism latching plate in a particularly simple and cost-effective manner. Moreover, according to the invention it is possible, as a result, in a simple and cost-effective manner, to permit a scalability of the latching fitting of the vehicle seat according to the invention for different loading situations and/or applications (namely as a so-called belt-integral seat or as a seat without an integral belt). As a result of the radial mounting of the first fitting part by the mechanism plate and/or by the axial mounting of the first fitting part by the mechanism latching plate, it is advantageously possible according to the invention to design the flux of force inside the fitting of the vehicle seat according to the invention such that the tilting moments which occur remain relatively small and thus a particularly stable design and/or a particularly high loading capacity of the fitting is possible, with relatively low material consumption and thus also low costs and constructional space requirement.

In particular, it is preferred according to the invention if the fitting comprises a bearing plate and the first fitting part, in addition to the mechanism plate, is radially mounted by the bearing plate and/or if the fitting comprises a cover plate and the first fitting part, on the one hand, is axially mounted by the mechanism latching plate and, on the other hand, is axially mounted by the cover plate. As a result, a particularly high degree of stability is afforded to the latching fitting according to the invention and/or the vehicle seat with a corresponding latching fitting.

Moreover, it is preferred according to the invention if the mechanism latching plate, the mechanism plate, the bearing plate and the cover plate are provided firmly connected to one another, in particular welded and/or if the fitting comprises two fitting elements which are minor symmetrical to a plane of symmetry extending perpendicular to the rotational axis, each of the fitting elements either comprising the mechanism latching plate and the mechanism plate and the bearing plate and the cover plate or the mechanism latching plate and the mechanism plate and the cover plate. As a result, in particular, a scalability of the loading may result.

According to the invention, it is also preferred that the backrest part may be locked in at least one position to the second fitting part or to a retaining element connected directly to the seat part and/or that the latching apparatus is a latching pawl, the latching pawl, in particular, being provided to be able to be locked and actuated by a locking cam.

It may also be advantageously provided according to the invention that the fitting comprises two fitting elements which are mirror symmetrical to a plane of symmetry extending perpendicular to the rotational axis, each of the fitting elements comprising the mechanism latching plate and/or the mechanism plate and each of the fitting elements comprising at least one externally toothed backrest mechanism plate, between the fitting elements a contour offset being provided for the engagement of the respective mechanism latching plate and/or the respective mechanism plate in the at least one respective backrest mechanism plate. As a result, according to the invention it is advantageously possible that, on the one hand, the mobility and/or smooth running of the adjustment fitting of the vehicle seat according to the invention is increased and, at the same time, the noise development is reduced when actuating the adjustment fitting, but in the event of an accident a relatively high degree of safety is always achieved by the teeth, which run therewith but in normal use are not in contact, bringing about an additional reinforcement action against, for example, an undesirably large rotary adjustment of the first fitting part in such a case of an accident occurring. A corresponding contour offset according to the invention may also be advantageously provided between the respective mechanism latching plates of the fitting elements during the engagement thereof with the latching pawl, so that advantageously the locking by the latching pawl may be easily operated and is smooth running.

It is, therefore, also possible according to the invention with a vehicle seat without free pivotability of the first fitting part, to combine noise reduction during the adjustment process and smoother running with a greater degree of safety in the event of an accident and/or stability. This is possible by means of a vehicle seat with a backrest part, with a seat part and with a fitting for adjusting the inclination of the backrest part in relation to the seat part, the fitting comprising a first fitting part firmly connected to the backrest part and a second fitting part firmly connected to the seat part, the fitting parts being connected to one another so that they may be adjusted smoothly in terms of angle by means of an adjusting mechanism, the fitting comprising two fitting elements which are minor symmetrical to a plane of symmetry extending perpendicular to the rotational axis, each of the fitting elements comprising the mechanism latching plate and/or the mechanism plate and each of the fitting elements comprising at least one externally toothed backrest mechanism plate, between the fitting elements a contour offset being provided for the engagement of the respective mechanism latching plate and/or the respective mechanism plate in the at least one respective backrest mechanism plate. Thus a mechanism is created with at least two pairs of teeth, in particular at least two gearwheel pairs, in which according to the invention it is provided that in normal operation only one portion of the pairs of teeth forms the load path in the mechanism, in the event of overload, however, (for example during an accident) the remaining pairs of teeth also absorbing load and thus relieving the first load path. Preferably, all pairs of teeth have substantially the same contour, the teeth which are only load-bearing in the event of overload having a small contour offset relative to the load-bearing teeth, so that they are not in contact with one another. In the event of overload, the load-bearing teeth deform or are displaced so that the pairs of teeth which have hitherto not been in contact come into contact. In this manner, the friction losses in normal operation of the mechanism are reduced, without limiting the strength in the event of overload.

DRAWINGS

The figures represent by way of example and schematically an embodiment of the invention. In the exemplary embodiment, the inclination adjustment device is constructed in a substantially minor-inverted manner.

DETAILED DESCRIPTION

Figure 1:
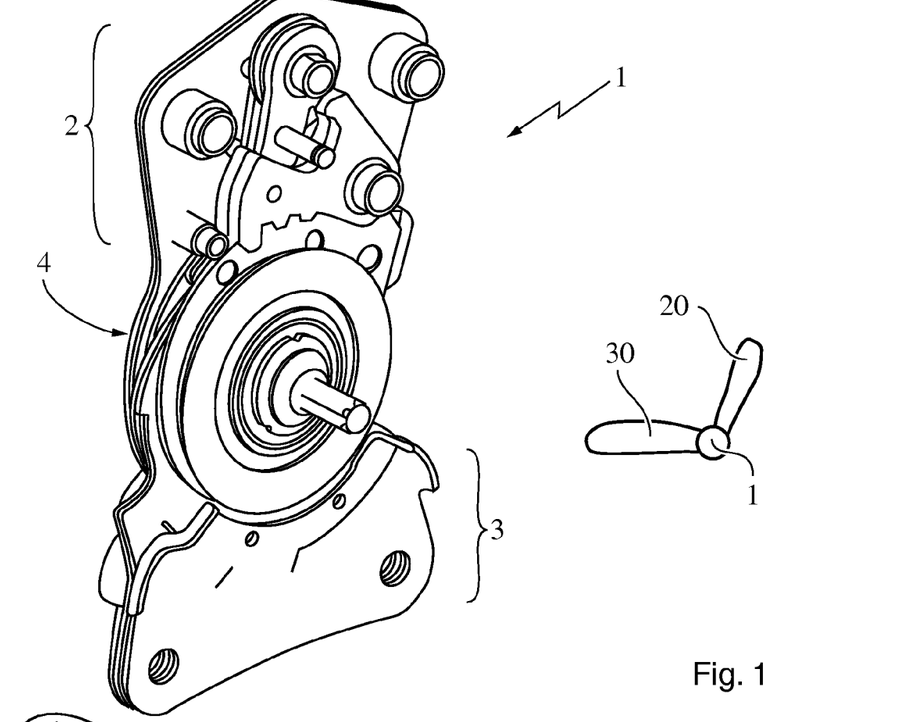
FIGS. 1 and 2 show an inclination adjustment device and/or fitting in two different inclined positions.
Figure 2:
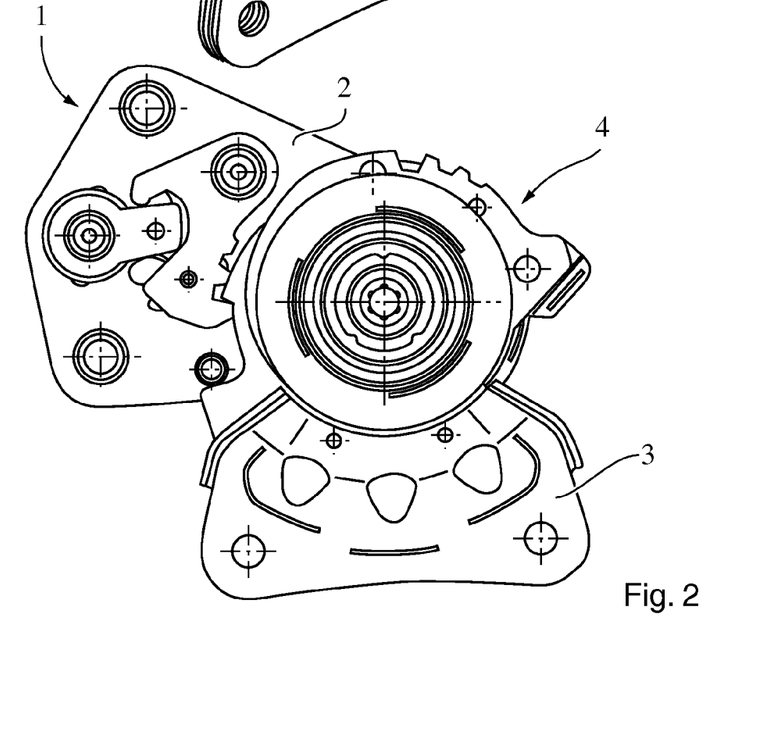

The inclination adjustment device 1 and/or fitting 1 shown in FIG. 1 comprises a first fitting part 2, which is firmly connected to a backrest 20 of a vehicle seat shown schematically in the right hand part of FIG. 1, as well as a second fitting part 3 fixed to the seat part. Both fitting parts 2, 3 are connected to one another such that they may be adjusted smoothly in terms of angle by means of an adjusting mechanism 4. The adjusting mechanism 4 is according to the invention configured, in particular, as a wobble mechanism 4 and is thus also denoted hereinafter as a wobble mechanism 4. With regard to the construction and the operation of such mechanisms, reference is made to the publication WO 20061040303 A2, the disclosure thereof thus being incorporated entirely in the present description by reference. The first fitting part 2 is also able to be pivoted after releasing a latching pawl 5 relative to the adjusting mechanism 4 from the position of use according to FIG. 1 into a table position according to FIG. 2 and locked again there.

Figure 3:
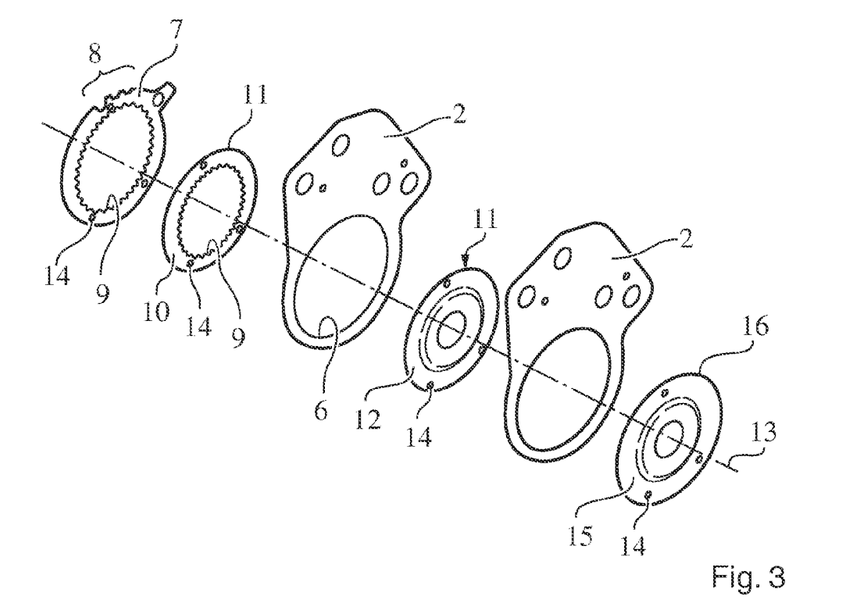
FIG. 3 shows the inclination adjustment device and/or fitting in an exploded view.

As is visible from FIG. 3, the first fitting part 2 constructed as a pair (comprising in particular two parts, in particular sheet metal parts) has a circular recess 6, by means of which it is rotatably supported on the adjusting mechanism 4. The adjusting mechanism 4, shown merely in part in FIG. 3, comprises a mechanism latching plate 7 with partial external teeth 8 for the engagement of the latching pawl 5, and internal teeth 9 as a component of the planetary drive, as well as an outer mechanism plate 10 with a circular outer periphery 11 and internal teeth 9. The mechanism latching plate 7 and the mechanism plate 10 are also, in particular, designed as planar punched parts in a similar manner to the first fitting part 2. Additionally, a bearing plate 12 is provided which is punched and pressed, in particular, and also has a circular outer periphery 11. The outer periphery 11 of the mechanism plate 10 and the bearing plate 12 is dimensioned such that the recess 6 of the first fitting part is rotatably mounted thereon, substantially without clearance. The mechanism latching plate 7 thus secures the first fitting part 2 in the one direction axially, whilst an additional cover plate 15 forms the axial securing in the other direction with an enlarged outer periphery 16. The bearing plate 12, moreover, also provides a mounting for a centrally arranged bearing part 40 which is not shown, however, in FIG. 3 (see FIG. 11).

The mechanism latching plate 7, the mechanism plate 10, the bearing plate 12 and the cover plate 15 are connected to one another, in particular laser welded, after positioning the plates (comprising the recess 6) of the first fitting part 2 coaxially to the rotational axis 13 of the free pivoting mechanism. Congruent bores 14 in the components facilitate accurate alignment by the insertion of a mounting device.

Figure 4:
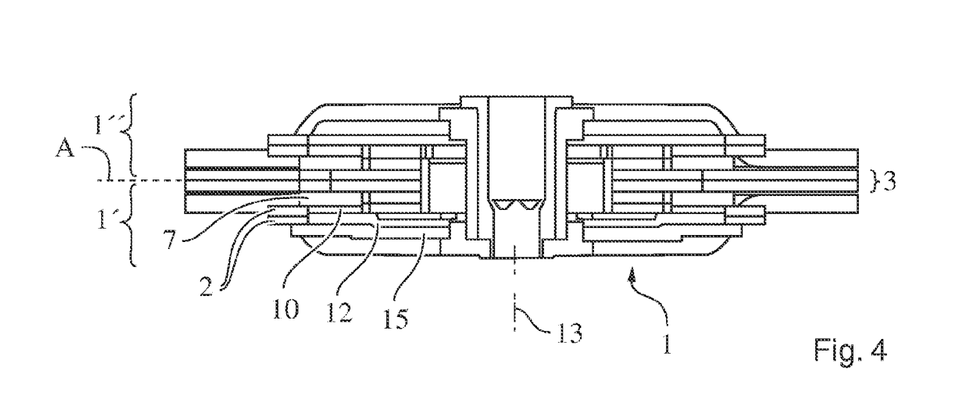
FIG. 4 shows the inclination adjustment device and/or fitting in a sectional view.
Figure 5:
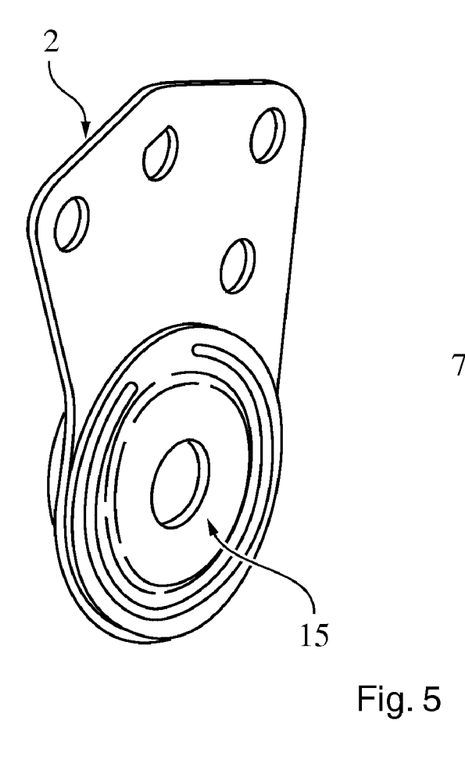
FIGS. 5-9 show parts of the inclination adjustment device and/or fitting in different views.
Figure 6:
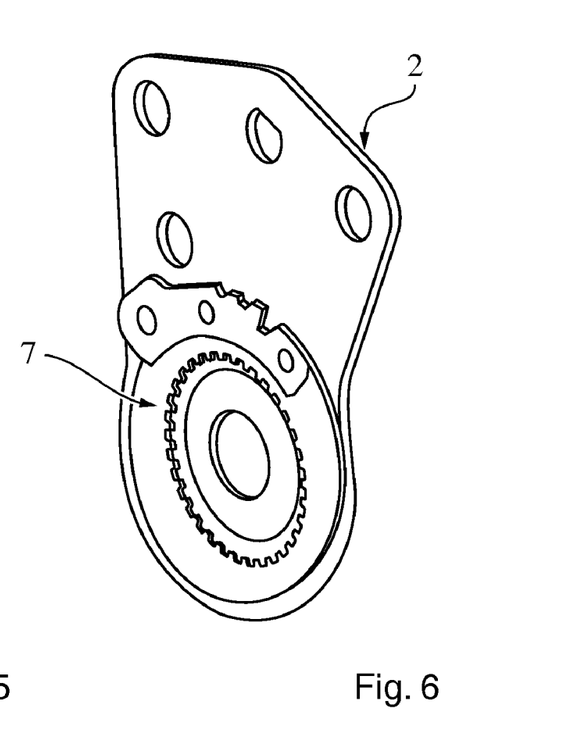

FIG. 4 shows a section through the mounted inclination adjustment device 1 and/or fitting 1. In this connection the fitting 1 shown in FIG. 4 is constructed such that the fitting 1 as a whole has a first fitting element 1' and a second fitting element 1". The fitting elements 1', 1" are substantially symmetrically configured relative to a plane of symmetry A. In this connection, "substantially symmetrically configured" means that the fitting elements 1', 1" in their radial outer region, i.e. relatively far removed from the rotational axis 13, are constructed substantially entirely mirror symmetrically relative to the plane of symmetry A.

Figure 7:
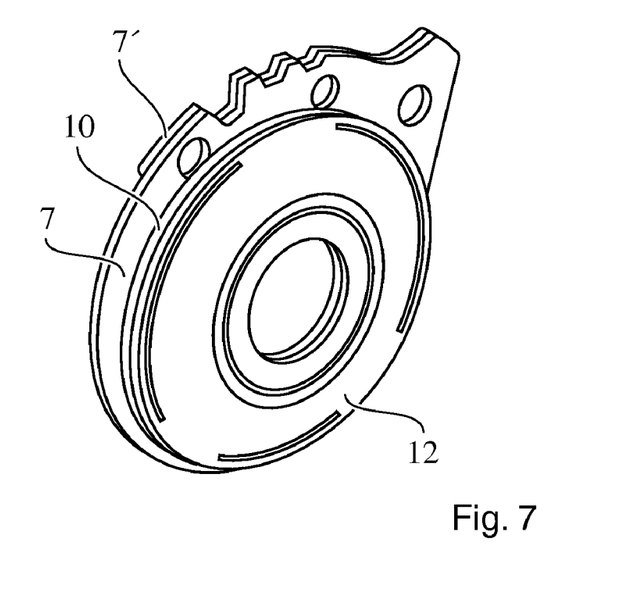
Figure 8:
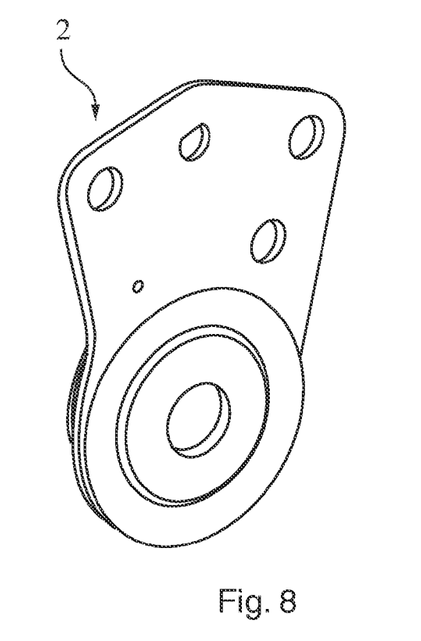
Figure 9:
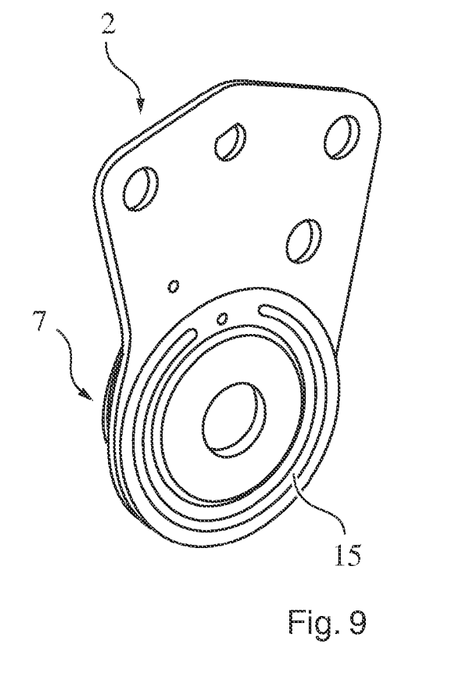

FIGS. 5 to 9 show parts of the inclination adjustment device 1 and/or fitting 1 in different views. In this connection, FIGS. 5, 6, 8, and 9 show respectively a perspective view of the parts and/or components of the fitting 1 shown in FIG. 3 in the assembled form (as a result of the concealment, a portion of these components and/or parts not being visible), namely the first fitting part 2, the internally toothed and partially externally toothed mechanism latching plate 7 and the cover plate 15. FIG. 7 shows a perspective view of the majority (namely without the first fitting part 2) of the parts and/or components of the fitting 1 shown in FIG. 3 in the assembled form (as a result of the concealment, a portion of these components and/or parts not being visible), namely the internally toothed and partially externally toothed mechanism latching plate 7, the mechanism plate 10 and the bearing plate 12. In this connection, it may be seen in particular in FIG. 7 that the mechanism latching plate 7 in a radial outer region and in a region axially remote from the mechanism plate 10 has a reinforcing element 7', by means of which, firstly, a reinforcement of the retaining force of the locking of the first fitting part 2 to the mechanism latching plate 7 may be produced and by means of which, secondly, in a simple manner a connection with the corresponding mechanism latching plate of a fitting element 1', 1" which is arranged minor symmetrically (not shown) may be produced. In this last-mentioned case, the reinforcing element 7' is preferably only present once and connects the mechanism latching plates 7 of the two fitting elements 1', 1". For fastening and/or aligning (before a connection of the reinforcing element 7' to the mechanism latching plates 7) the reinforcing element 7' relative to the mechanism latching plates 7, preferably depressions and/or recesses and pins and/or lugs may be present on the reinforcing element 7' and/or the mechanism latching plates 7. In this regard, the mechanism latching plates 7 are possibly not entirely planar, but planar on the greatest part of their surface (namely outside the pins and/or lugs for fastening and/or aligning with the reinforcing element 7') and thus may be understood as a whole as being substantially planar.

Figure 10:
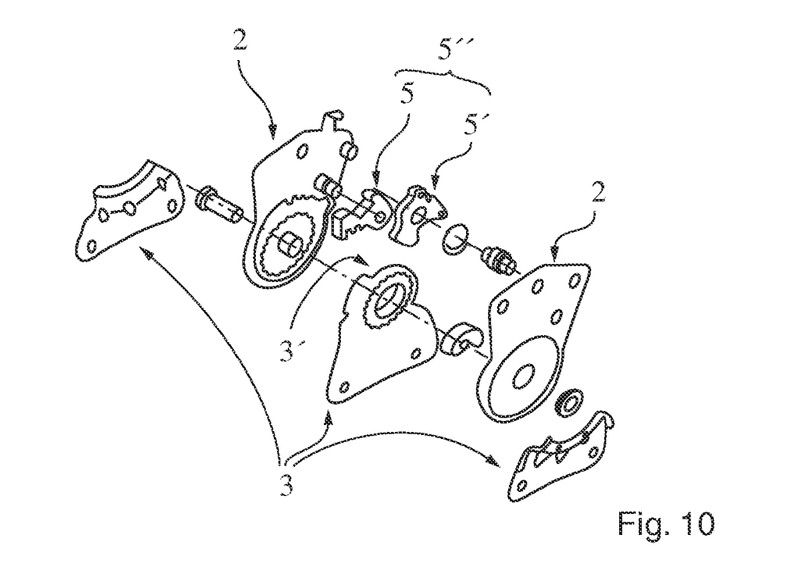
FIGS. 10-12 show further exploded views of the inclination adjustment device and/or fitting.
Figure 11:
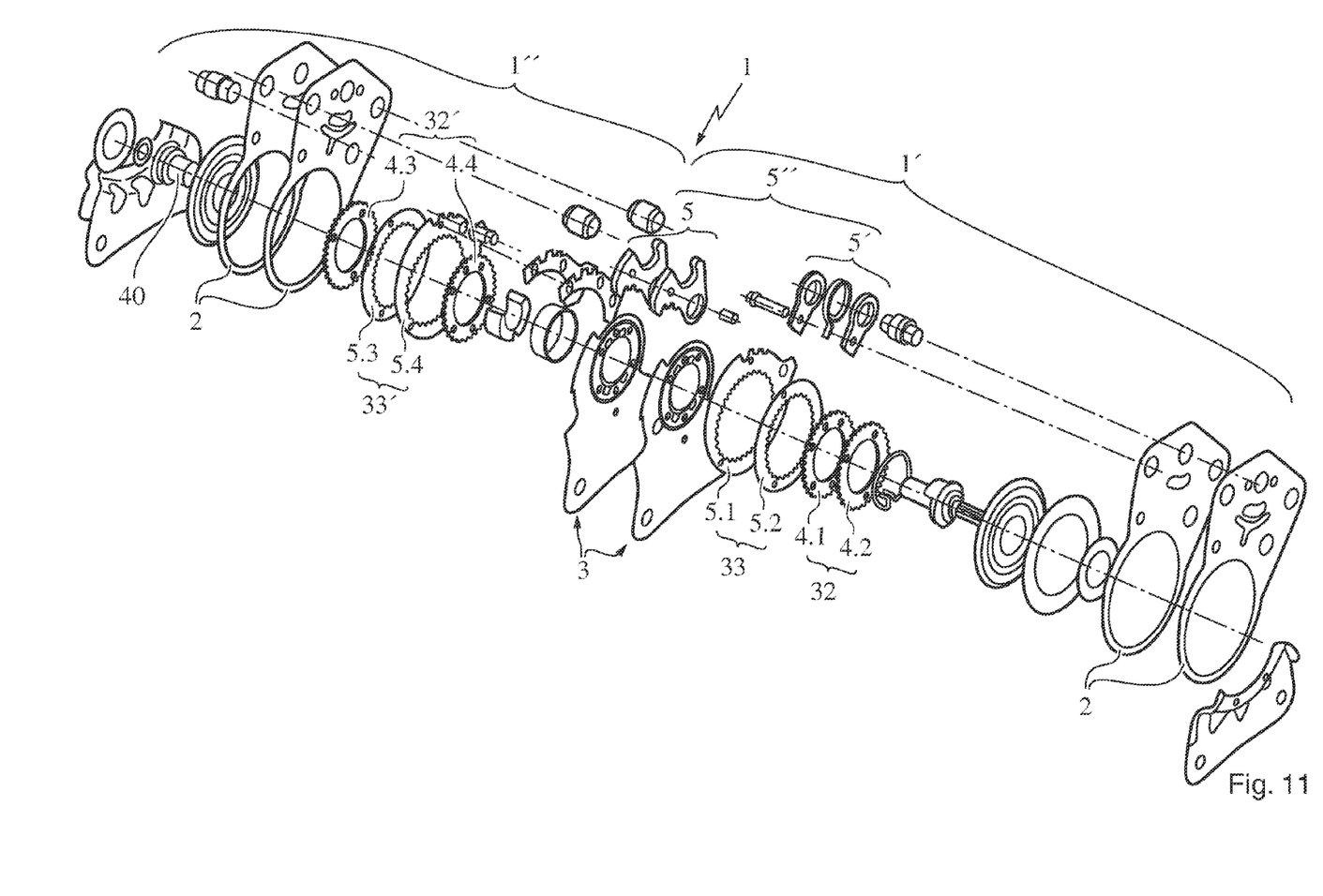
Figure 12:
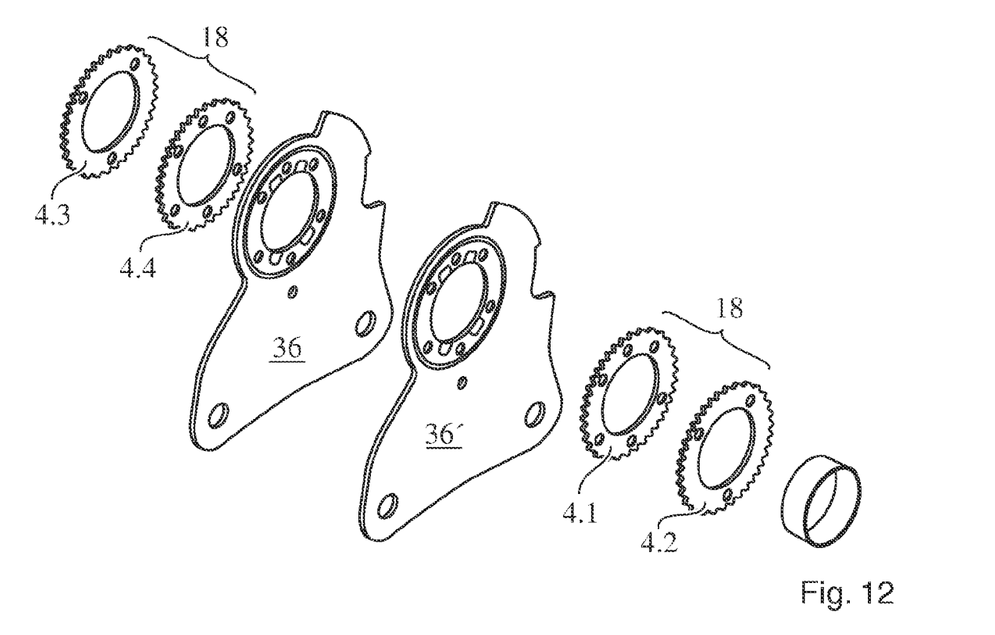
Figure 13:
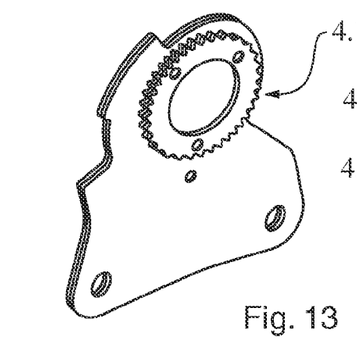
FIGS. 13-15 show parts of the inclination adjustment device and/or fitting in different views for illustrating a contour offset.
Figure 14:
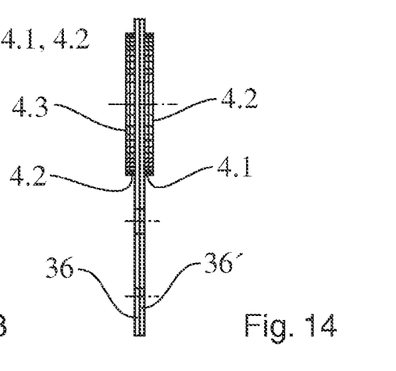
Figure 15:
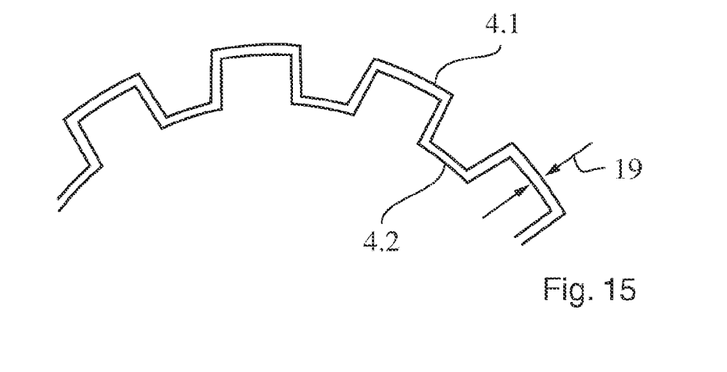

In FIGS. 10 to 12, further exploded views of the inclination adjustment device 1 and/or fitting 1 are shown. In this connection, FIG. 10 shows an exploded view of a fitting 1 constructed from two fitting elements 1', 1", the first fitting part 2 being shown. The second fitting part 3 is provided with an externally toothed element 3' in engagement with the internal teeth of the mechanism latching plate 7 and/or the mechanism plate 10. From FIG. 10, the latching pawl 5 may be seen which may be locked to and unlocked from the partial external teeth of the mechanism latching plate 7. The latching pawl 5, in particular, cooperates with a locking cam 5', in order to lock or unlock the first fitting part 2 to or from the mechanism latching plate 7. Thus, hereinafter, the latching pawl 5 (together with the locking cam 5') is also denoted as a latching apparatus 5". In FIG. 11 is also an exploded view of a fitting 1 constructed from two fitting elements 1', 1", the first fitting part 2, the latching apparatus 5", the second fitting part 3 as well as the fitting elements 1', 1" being shown. In FIG. 11, moreover, are shown two groups 32, 32' of externally toothed gearwheels 4.1 to 4.4 arranged in a minor-inverted manner to one another and two groups 33, 33' of internally toothed gearwheels 5.1 to 5.4 arranged in a mirror-inverted manner to one another. In this case, one respective externally toothed gearwheel 4.1 to 4.4 is associated with an internally toothed gearwheel 5.1 to 5.4 with the same index for forming a gearwheel pair. In FIG. 12 to FIG. 14, only the externally toothed gearwheels 4.1 to 4.4 are shown which are positioned on retaining parts 36, 36'. In the embodiment, all internally toothed gearwheels 5.1 to 5.4 are designed to be exactly congruent within the context of production tolerances. Relative to the gearwheel 4.1 which is only substantially congruent, however, the externally toothed gearwheels 4.2 to 4.4 have a small contour offset 19 away from their central axis 37 (FIG. 15), for example of 0.1 mm (namely corresponding to 0.001 to 0.002 times the outer diameter of the gearwheels 4.1 to 4.4). In normal operation (the retaining and adjustment function of the adjusting mechanism 1) only one gearwheel pair of the gearwheels 4.1 and 5.1 is thus in engagement, whilst the remaining gearwheels 4.2 to 4.4 and 5.2 to 5.4 rotate together without contact. In the event of overload, this offset and/or contour offset 19 is compensated by elastic, possibly also plastic, deformation of the gearwheel 4.1 and/or 5.1, so that subsequently all gearwheels 4.1 to 4.4 and 5.1 to 5.4 are load-bearing. In the present case, for example, the gearwheels 5.1 and 5.2 correspond to the internal teeth of the mechanism latching plate 7 and the mechanism plate 10 for the first fitting element 1' and the gearwheels 5.4 and 5.3 correspond to the internal teeth of the mechanism latching plate 7 and the mechanism plate 10 for the second fitting element 1". The gearwheels 4.1 to 4.4 are hereinafter, in particular, denoted as backrest mechanism plates 18 (see FIG. 12).

It is understood that other, or a plurality of, but not all, gearwheel pairs may be in engagement under normal load (for example two (namely 4.1 and 4.2 with 5.1 and 5.2) gearwheel pairs in engagement and two gearwheel pairs (namely 4.3, 4.4, 5.3 and 5.4) not in engagement). It is also conceivable to limit the contour offset 19 to the regions of the gearwheel contour which would otherwise come into contact with the associated teeth, under normal load. Alternatively or additionally, it may be provided to equip some of the internally toothed gearwheels 5.1 to 5.4 with a contour offset 19.

Figure 16:
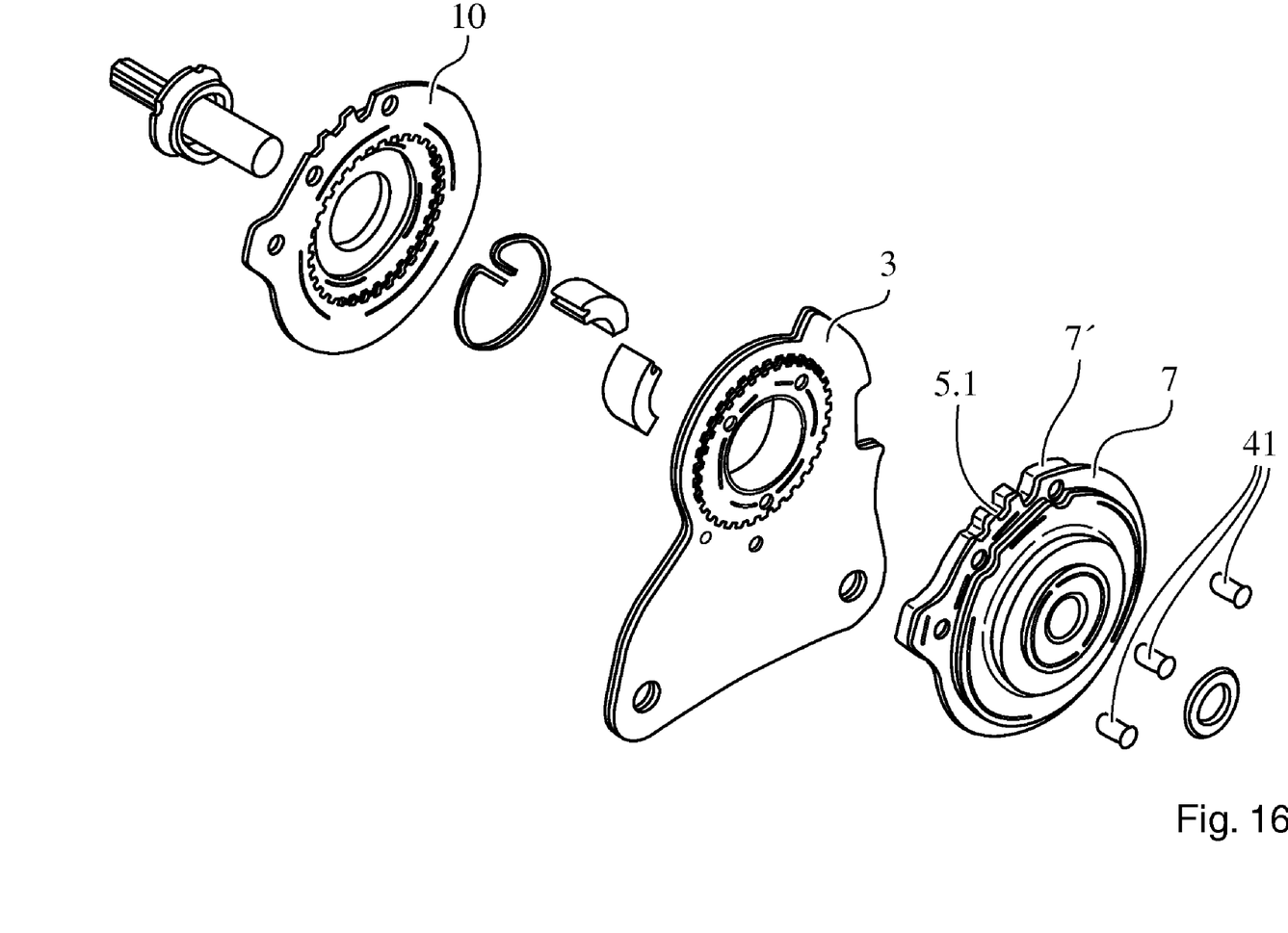
FIG. 16 shows an additional exploded view of the inclination adjustment device and/or fitting.

FIG. 16 shows an additional exploded view of the inclination adjustment device and/or fitting. In this case the reinforcing element 7' is respectively welded to both mechanism latching plates 7. The reinforcing element 7' has a nominal contour. The engagement teeth of the internally toothed gearwheels 5.1, 5.4 have relative to the reinforcing element 7' an offset in order to compensate for tolerances. The inclination adjustment device is held together by rivets 41 in order to be able to have a greater load-bearing capacity.

Figure 17:
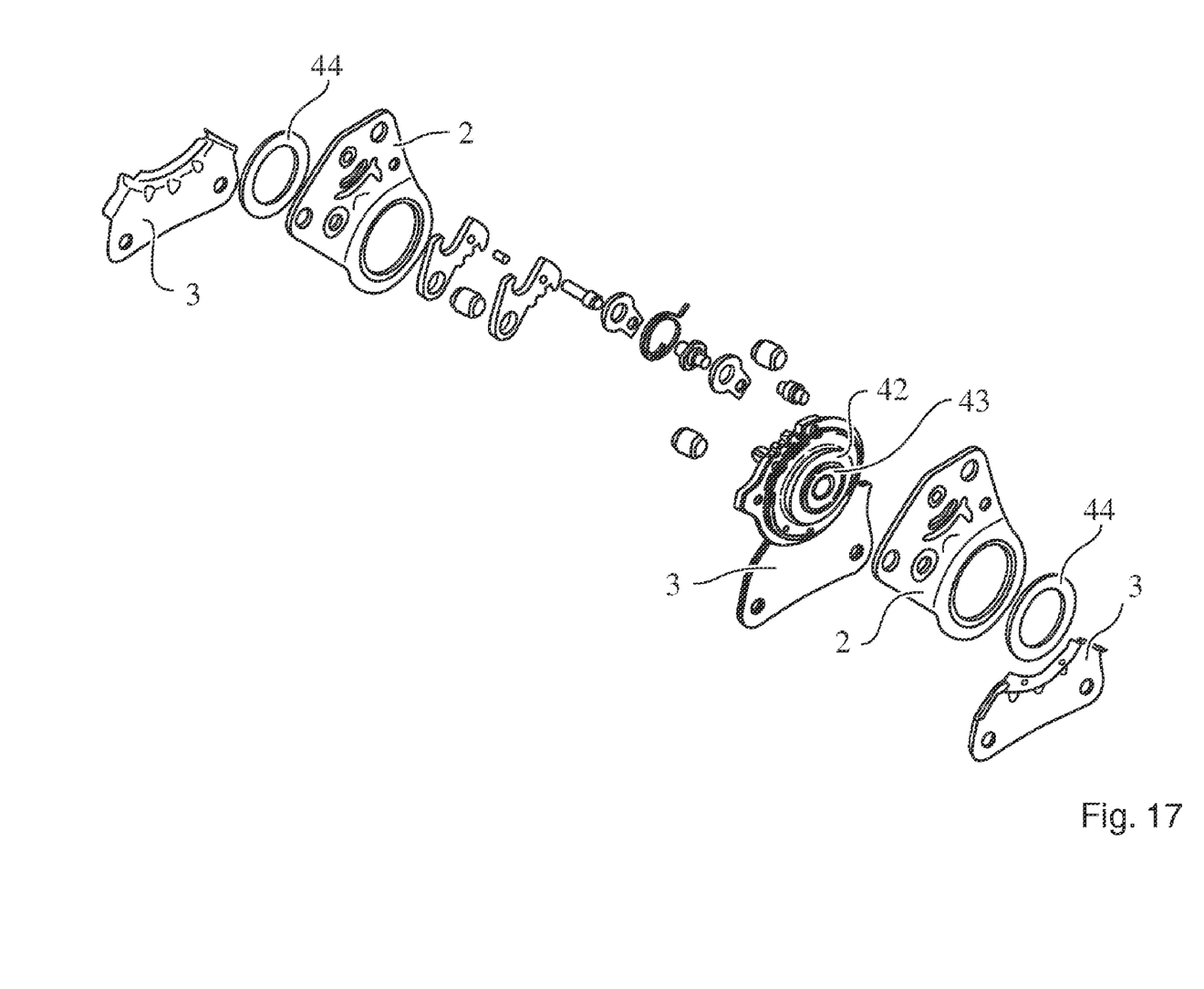
FIG. 17 shows a further additional exploded view of an inclination adjustment device and/or fitting.

FIG. 17 shows an additional exploded view of the inclination adjustment device and/or fitting. In this case the first fitting parts 2 are mounted rotatably on the second fitting part by means of bearing plates 43. The bearing plates are welded to cover plates 42. Moreover, this inclination adjustment device has axial stops 44 for the first fitting parts 2.

The invention claimed is:

1. A vehicle seat, in particular motor vehicle seat, comprising a backrest part and a seat part with a fitting for adjusting inclination of the backrest part in relation to the seat part, the fitting having a first fitting part which is firmly connected to the backrest part, and a second fitting part which is firmly connected to the seat part, the fitting parts being connected to one another and configured to be adjusted smoothly angularly by an adjusting mechanism, the first fitting part being able to be locked in relation to the adjusting mechanism by a latching apparatus, and being able to be pivoted about a rotational axis in relation to the adjusting mechanism after the latching apparatus is released, the adjusting mechanism comprising an internally toothed member, the first fitting part being mounted in a plane of the internally toothed member extending generally perpendicular to the rotational axis of the first fitting part, wherein the adjusting mechanism comprises an internally toothed mechanism latching plate and/or an internally toothed mechanism plate, the mechanism plate and/or the mechanism latching plate being provided substantially as planar punched parts.

2. The vehicle seat as claimed in claim 1, wherein the first fitting part is radially mounted by the mechanism plate, and/or the first fitting part is axially mounted by the mechanism latching plate.

3. The vehicle seat as claimed in claim 1, wherein the fitting comprises a bearing plate, the first fitting part and the mechanism plate being radially mounted by the bearing plate.

4. The vehicle seat as claimed in claim 1, wherein the fitting comprises a cover plate, the first fitting part, on one side, being axially mounted by the mechanism latching plate and, on another side, being axially mounted by the cover plate.

5. The vehicle seat as claimed in claim 1, wherein the mechanism latching plate, the mechanism plate, a bearing plate and a cover plate are firmly connected to one another.

6. The vehicle seat as claimed in claim 5, wherein the mechanism latching plate, the mechanism plate, the bearing plate and the cover plate are welded to one another.

7. The vehicle seat as claimed in claim 1, wherein the fitting comprises two fitting elements which are mirror symmetrical about a plane of symmetry extending generally perpendicular to the rotational axis of the first fitting part, each of the fitting elements comprising a respective mechanism latching plate, a respective mechanism plate, a bearing plate, and a cover plate, or a respective mechanism latching plate, a respective mechanism plate, and a cover plate.

8. The vehicle seat as claimed in claim 1, wherein the backrest part may be locked in at least one position to the second fitting part or to a retaining element connected directly to the seat part.

9. The vehicle seat as claimed in claim 1, wherein the latching apparatus comprises a latching pawl.

10. The vehicle seat as claimed in claim 9, comprising a locking cam, and wherein the latching pawl is configured to be locked and actuated by the locking cam.

11. The vehicle seat as claimed in claim 1, wherein the fitting comprises two fitting elements which are mirror symmetrical about a plane of symmetry extending generally perpendicular to the rotational axis of the first fitting part, each of the fitting elements comprising a respective internally toothed member and at least one externally toothed backrest mechanism plate, between the fitting elements a contour offset being provided for the engagement of the respective internally toothed member in the respective at least one backrest mechanism plate.

12. The vehicle seat as claimed in claim 1, wherein the fitting comprises two fitting elements which are mirror symmetrical about a plane of symmetry extending generally perpendicular to the rotational axis of the first fitting part, each of the fitting elements comprising a respective mechanism latching plate and between the fitting elements a contour offset being provided for the engagement of the respective mechanism latching plate in a latching pawl.

13. The vehicle seat as claimed in claim 12, wherein the mechanism latching plates of the fitting elements are provided connected to one another via a reinforcing element.

14. A vehicle seat, in particular motor vehicle seat, comprising a backrest part and a seat part with a fitting for adjusting inclination of the backrest part in relation to the seat part, the fitting having a first fitting part which is firmly connected to the backrest part, and a second fitting part which is firmly connected to the seat part, the fitting parts being connected to one another and configured to be adjusted smoothly angularly by an adjusting mechanism, the first fitting part being able to be locked in relation to the adjusting mechanism by a latching apparatus, and being able to be pivoted about a rotational axis in relation to the adjusting mechanism after the latching apparatus is released, the adjusting mechanism comprising an internally toothed member, the first fitting part being mounted in a plane of the internally toothed member extending generally perpendicular to the rotational axis of the first fitting part, wherein the internally toothed member comprises an internally toothed mechanism latching plate.

15. A vehicle seat, in particular motor vehicle seat, comprising a backrest part and a seat part with a fitting for adjusting inclination of the backrest part in relation to the seat part, the fitting having a first fitting part which is firmly connected to the backrest part, and a second fitting part which is firmly connected to the seat part, the fitting parts being connected to one another and configured to be adjusted smoothly angularly by an adjusting mechanism, the first fitting part being able to be locked in relation to the adjusting mechanism by a latching apparatus, and being able to be pivoted about a rotational axis in relation to the adjusting mechanism after the latching apparatus is released, the adjusting mechanism comprising an internally toothed member, the first fitting part being mounted in a plane of the internally toothed member extending generally perpendicular to the rotational axis of the first fitting part, wherein the internally toothed member comprises an internally toothed mechanism plate.

* * * * *